United States Patent
Kikuchi et al.

(10) Patent No.: US 10,017,618 B2
(45) Date of Patent: Jul. 10, 2018

(54) EXTRUDED POLYSTYRENE FOAM AND METHOD FOR PRODUCING SAME

(71) Applicant: KANEKA CORPORATION, Osaka-shi (JP)

(72) Inventors: Takenori Kikuchi, Settsu (JP); Wataru Kado, Settsu (JP); Koji Shimizu, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/025,415

(22) PCT Filed: Nov. 13, 2014

(86) PCT No.: PCT/JP2014/080090
§ 371 (c)(1),
(2) Date: Mar. 28, 2016

(87) PCT Pub. No.: WO2015/093195
PCT Pub. Date: Jun. 25, 2015

(65) Prior Publication Data
US 2016/0208067 A1    Jul. 21, 2016

(30) Foreign Application Priority Data

Dec. 20, 2013  (JP) ................ 2013-263998

(51) Int. Cl.
| | | |
|---|---|---|
| C08J 9/14 | (2006.01) | |
| C08L 25/04 | (2006.01) | |
| C08J 9/00 | (2006.01) | |

(52) U.S. Cl.
CPC ........... *C08J 9/149* (2013.01); *C08J 9/0019* (2013.01); *C08J 9/0023* (2013.01); *C08J 9/146* (2013.01); *C08J 9/147* (2013.01); *C08J 2201/03* (2013.01); *C08J 2203/12* (2013.01); *C08J 2203/142* (2013.01); *C08J 2203/162* (2013.01); *C08J 2203/164* (2013.01); *C08J 2203/182* (2013.01); *C08J 2325/06* (2013.01)

(58) Field of Classification Search
None
See application file for complete search history.

(56) References Cited

U.S. PATENT DOCUMENTS

| | | | |
|---|---|---|---|
| 6,225,364 B1 | 5/2001 | Chaudhary et al. | |
| 6,384,095 B1 | 5/2002 | Corr et al. | |
| 2006/0106122 A1* | 5/2006 | Naito | C08J 9/0019 521/79 |
| 2010/0087555 A1* | 4/2010 | Vo | C08J 9/127 521/56 |
| 2013/0281557 A1* | 10/2013 | Van Horn | C08J 9/146 521/97 |

FOREIGN PATENT DOCUMENTS

| | | |
|---|---|---|
| JP | 8-269224 A | 10/1996 |
| JP | 2000-508023 A | 6/2000 |
| JP | 2002-508419 A | 3/2002 |
| JP | 2002-144409 A | 5/2002 |
| JP | 2005-8739 A | 1/2005 |
| JP | 2005-23243 A | 1/2005 |
| JP | 2006-131702 A | 5/2006 |
| JP | 2008-546892 A | 12/2008 |
| JP | 2010-522808 A | 7/2010 |
| JP | 2012-7094 A | 1/2012 |
| JP | 201 3-1 941 0 | 9/2013 |

OTHER PUBLICATIONS

International Search Report dated Feb. 17, 2015 in PCT/JP2014/080090 filed on Nov. 13, 2014.

\* cited by examiner

*Primary Examiner* — Stephen E Rieth
(74) *Attorney, Agent, or Firm* — Oblon, McClelland, Maier & Neustadt, L.L.P.

(57) ABSTRACT

Provided is an extruded polystyrene foam which is obtained by extrusion foaming using a polystyrene resin and a foaming agent, contains 0.5-8.0 parts by weight of a flame retardant based on 100 parts by weight of the polystyrene resin and has an apparent density of 20-45 kg/m$^3$ and a closed cell ratio of 90% or more. The foaming agent contains HFO and an additional organic foaming agent. The amount of HFO is 0.030-0.125 mol/per 100 g of the polystyrene resin, polystyrene permeability of the additional organic foaming agent is 0.5×10$^{-10}$ cc·cm/cm$^2$·s·cmHg or more, an organic foaming agent having a polystyrene permeability of less than 0.5×10$^{-10}$ cc·cm/cm$^2$·s·cmHg is not included, and the total amount of HFO and the additional organic foaming agent is 0.105-0.300 mol/per 100 g of the polystyrene resin.

9 Claims, No Drawings

EXTRUDED POLYSTYRENE FOAM AND METHOD FOR PRODUCING SAME

TECHNICAL FIELD

The present invention relates to an extruded polystyrene foam and a method for producing the same.

BACKGROUND ART

The extruded polystyrene foam is continuously produced by heating and melting a styrene resin composition using an extruder or the like, adding a foaming agent under high-pressure conditions, cooling the resultant mixture to a predetermined resin temperature, and then extruding the resultant mixture into a low-pressure area.

The extruded polystyrene foam is used as, for example, heat insulating materials for structures due to good workability and insulation properties. In recent years, a demand for energy saving of residences, buildings, and the like has increased, so that a technical development of a higher heat insulating foam than before has been desired.

Heretofore, chlorofluorocarbon (hereinafter referred to as CFC), such as dichlorodifluoromethane, has been widely used as a physical foaming agent for use in production of the extruded polystyrene foam. However, CFC has a high risk of destroying the ozone layer, and therefore a hydrogen atom containing chlorofluorocarbon (hereinafter referred to as HCFC) with a small ozone depletion potential has been used as a substitute for the CFC. However, the ozone depletion potential of the HCFC is also not 0 (zero), and therefore it cannot be said that the HCFC is completely free from a risk of destroying the ozone layer. Thus, in recent years, hydrofluorocarbon (hereinafter referred to as HFC) which has an ozone depletion potential of 0 (zero) and does not have a chlorine atom in the molecules has been increasingly used as the foaming agent.

For example, Patent Document 1 discloses, as a method for producing a polystyrene resin foam which has excellent heat insulation performance over a long period of time and which can be suitably used for heat insulating materials for houses and the like using a front-based foaming agent having an ozone depletion potential of 0, a method for producing a foam having a density of $2 \times 10^{-2}$ to $4.5 \times 10^{-2}$ g/cm$^3$ including pressing a foaming agent obtained by mixing trifluoroethane which is one kind of HFC and methyl chloride into a polystyrene resin for extrusion foaming. However, there has been a problem that the HFC has a high global warming potential.

Thus, a method for producing an extruded polystyrene foam insulating board using a fluorinated olefin (hydrofluoroolefin, which is also referred to as HFO) which has an ozone depletion potential of 0 (zero) and has a small global warming potential, and thus is friendly to the environment as an alternative foaming agent of the HFC has been proposed (for example, refer to Patent Documents 2 to 5). However, these former techniques have not succeeded in obtaining an extruded polystyrene foam having excellent heat insulation properties and flame retardancy sufficiently utilizing the merits (low thermal conductivity, flame retardancy) of using the hydrofluoroolefin, and thus these former techniques still have had problems.

CITATION LIST

Patent Literatures

Patent Document 1: JP-A No. H08-269224
Patent Document 2: JP-A No. 2012-007094
Patent Document 3: JP-T No. 2008-546892
Patent Document 4: JP-A No. 2013-194101
Patent Document 5: JP-T No. 2010-522808

SUMMARY OF INVENTION

Technical Problem

It is an object of the present invention to easily obtain an extruded polystyrene foam, which is lightweight and has excellent heat insulation properties and flame retardancy, has an ozone depletion potential of 0, and has a small global warming potential, and thus is friendly to the environment.

Solution to Problem

The present inventors have conducted an extensive research in order to solve the above-described problems, and, as a result, accomplished the present invention by the use of a specific amount of a mixed foaming agent of HFO and a specific organic foaming agent as a physical foaming agent for the production of an extruded polystyrene foam.

More specifically, the present invention is as follows.
[1] An extruded polystyrene foam which is obtained by performing extrusion foaming using a styrene resin and a foaming agent, contains a flame retardant in a proportion of 0.5 parts by weight or more and 8.0 parts by weight or less based on 100 parts by weight of the styrene resin, and has an apparent density of 20 kg/m$^3$ or more and 45 kg/m$^3$ or less and a closed cell ratio of 90% or more, in which the foaming agent at least contains hydrofluoroolefin and another organic foaming agent,
  (i) the blended amount of the hydrofluoroolefin is 0.030 mol or more and 0.125 mol or less based on 100 g of the styrene resin,
  (ii) an organic foaming agent having a polystyrene permeability of $0.5 \times 10^{-10}$ cc·cm/cm$^2$·s·cmHg or more is contained as the another organic foaming agent,
  (iii) an organic foaming agent having a polystyrene permeability of less than $0.5 \times 10^{-10}$ cc·cm/cm$^2$·s·cmHg is not contained as the another organic foaming agent, and
  (iv) the total blended amount of the hydrofluoroolefin and the another organic foaming agent is 0.105 mol or more and 0.300 mol or less based on 100 g of the styrene resin.
[2] The extruded polystyrene foam according to [1], in which the blended amount of the hydrofluoroolefin is 0.040 mol or more and 0.105 mol or less based on 100 g of the styrene resin.
[3] The extruded polystyrene foam according to [1] or [2], in which the hydrofluoroolefin is tetrafluoropropene.
[4] The extruded polystyrene foam according to any one of [1] to [3], in which the another organic foaming agent is one kind or a mixture containing two or more kinds selected from dimethylether, methyl chloride, and ethyl chloride.
[5] The extruded polystyrene foam according to any one of [1] to [4], in which the another organic foaming agent is dimethylether.
[6] The extruded polystyrene foam according to any one of [1] to [5], containing, as the flame retardant, a bromine-based flame retardant in a proportion of 0.5 parts by weight or more and 6.0 parts by weight or less based on 100 parts by weight of the styrene resin.
[7] A method for producing an extruded polystyrene foam by performing extrusion foaming using a styrene resin and a foaming agent, and the method includes heating and melting a styrene resin composition containing a flame retardant in a proportion of 0.5 parts by weight or more and 8.0 parts by weight or less based on 100 parts by weight of the styrene resin, adding the foaming agent under high-pressure conditions, cooling the resultant mixture to a predetermined resin temperature, and then extruding the cooled mixture into a low-pressure area to mold an extruded foam having an apparent density of 20 kg/m$^3$ or more and 45 kg/m$^3$ or less and a closed cell ratio of 90% or more, in which at least hydrofluoroolefin and another organic foaming agent are used as the foaming agent, (i) the blended amount of the hydrofluoroolefin is 0.030 mol or more and 0.125 mol or less based on 100 g of the styrene resin, (ii) an organic foaming agent having a polystyrene permeability of $0.5 \times 10^{-10}$ cc·cm/cm$^2$·s·cmHg or more is used as the another organic foaming agent, (iii) an organic foaming agent having a polystyrene permeability of less than $0.5 \times 10^{10}$ cc·cm/cm$^2$·s·cmHg is not used as the another organic foaming agent, and (iv) the total blended amount of the hydrofluoroolefin and the another organic foaming agent is 0.105 mol or more and 0.300 mol or less based on 100 g of the styrene resin.

Advantageous Effects of Invention

According to the present invention, an extruded polystyrene foam which is lightweight and has excellent heat insulation properties and flame retardancy, has an ozone depletion potential of 0, and has a small global warming potential, and thus is friendly to the environment can be easily obtained.

DESCRIPTION OF EMBODIMENTS

Hereinafter, an embodiment of the present invention is described. This embodiment is merely a part of the present invention, and thus it is a matter of course that this embodiment can be altered as appropriate insofar as the scope of the present invention is not altered.

An extruded polystyrene foam of the present invention contains a flame retardant in a proportion of 0.5 parts by weight or more and 8.0 parts by weight or less based on 100 parts by weight of a styrene resin, in which the apparent density is 20 kg/m$^3$ or more and 45 kg/m$^3$ or less and the closed cell ratio is 90% or more. The extruded polystyrene foam is continuously produced by heating and melting a styrene resin composition containing a specific amount of a flame retardant and, as necessary, a proper amount of other additives using an extruder or the like, adding a specific amount of a specific mixed foaming agent containing HFO under high-pressure conditions, cooling the resultant mixture to a predetermined resin temperature, and then extruding the cooled mixture into a low-pressure area.

The styrene resin for use in the present invention is not particularly limited and examples of the styrene resin include homopolymers of styrene monomers such as styrene, methylstyrene, ethylstyrene, isopropylstyrene, dimethylstyrene, bromostyrene, chlorostyrene, vinyltoluene, and vinylxylene, or copolymers of two or more of the monomers, copolymers obtained by copolymerization of the styrene monomer with at least one or two or more of monomers such as divinylbenzene, butadiene, acrylic acid, methacrylic acid, methyl acrylate, methyl methacrylate, acrylonitrile, maleic anhydride, and itaconic anhydride, and the like. The monomers to be copolymerized with the styrene monomer, such as acrylic acid, methacrylic acid, methyl acrylate, methyl methacrylate, maleic anhydride, and itaconic anhydride, can be used with such an amount that the physical properties, such as compressive strength, of the extruded polystyrene foam to be produced are not impaired. The styrene resin for use in the present invention is not limited to the homopolymers or the copolymers of the styrene monomers and may be a blend of the homopolymers or the copolymers of the styrene monomers and the homopolymers or the copolymers of the other monomers, and a diene rubber reinforced polystyrene or an acrylic rubber reinforced polystyrene can be blended. The styrene resin for use in the present invention may be a styrene resin having a branched structure for the purpose of adjusting the melt flow rate (hereinafter also referred to as MFR), a melt viscosity and a melt tension in molding, and the like.

As the styrene resin in the present invention, a styrene resin having an MFR of 0.1 to 50 g/10 minutes is preferably used in the respect that a thermoplastic resin foam in which the moldability in extrusion foam molding is excellent, the discharge amount in molding, the thickness and the width and the apparent density or the closed cell ratio of the obtained extruded polystyrene foam are easily adjusted to desired values, and the foamability (the foamability becomes better when the thickness and the width, the apparent density, the closed cell ratio, the surface properties, and the like of a foam are more easily adjusted), the appearance, and the like are good can be obtained, and an extruded polystyrene foam having well-balanced characteristics such as mechanical strengths including compressive strength, bending strength, and bending deflection and toughness can be obtained. The MFR of the styrene resin is preferably 0.3 to 30 g/10 minutes and more preferably 0.5 to 25 g/10 minutes in the respect that the balance between the mechanical strength, toughness, and the like and the moldability and the foamability. In the present invention, the MFR is measured by the method A in the test condition H of JIS K7210 (1999).

In the present invention, among the styrene resin mentioned above, polystyrene resin is suitable in the respect of economical efficiency and processability. When higher heat resistance is required in an extruded foam, it is preferable to use a styrene-acrylonitrile copolymer, (meth)acrylic acid-copolymerized polystyrene, maleic anhydride-modified polystyrene. When a higher impact resistance is demanded in an extruded foam, it is preferable to use rubber-reinforced polystyrene. The styrene resin may be used alone or two or more kinds of styrene resin different in a copolymerization component, a molecular weight and a molecular weight distribution, a branched structure, an MFR, and the like may be used as a mixture.

In the present invention, a mixed foaming agent of hydrofluoroolefin and a specific organic foaming agent is used as the foaming agent.

Examples of the hydrofluoroolefins include, for example, tetrafluoropropene, and specifically, trans-1,3,3,3-tetrafluoropropene (trans-HFO-1234ze), cis-1,3,3,3-tetrafluoropropene (cis-HFO-1234ze), 2,3,3,3-tetrafluoropropene (HFO-1234yf), and the like. These hydrofluoroolefins may be used alone or in combination of two or more kinds thereof.

The hydrofluoroolefin has an ozone depletion potential of 0 or a very small ozone depletion potential and has a very small global warming potential, and thus is an environmentally friendly foaming agent. Moreover, the hydrofluoroolefin has a low thermal conductivity in a gas state and is fire retardant, and therefore, the hydrofluoroolefin can give excellent heat insulation properties and flame retardancy by the use of the hydrofluoroolefin as the foaming agent of an extruded polystyrene foam.

Heretofore, HFO having relatively high solubility in polystyrene resin and having high compatibility with polystyrene resin, i.e., HFO which easily dissipates from the inside of a foam but a large amount of which can be added to polystyrene resin and which is excellent in foaming capability among HFOs, has been preferably used as the foaming agent, and an extruded foam with high foaming ratio has been able to be obtained.

On the other hand, in the case where tetrafluoropropene (1234ze, 1234yf) and the like which are HFOs having low solubility in polystyrene resin and low compatibility with polystyrene resin are used as the foaming agent, when a large amount of the tetrafluoropropene is added in order to obtain a foam having a high foaming ratio, the tetrafluoropropene dissociates from a resin melted substance in extrusion foaming, so that a largely recessed portion (hereinafter sometimes also referred to as a spot hole) is locally formed in the surface of the foam, which raises a possibility that the appearance of an insulating board deteriorates. When producing a foam having a large thickness, there has been a possibility that the closed cell ratio decreases and the long-term heat insulation properties decrease.

In the present invention, however, even in the case where HFO having relatively low solubility in polystyrene resin is used, the use of a specific mixed physical foaming agent allows the formation of a foam having a high foaming ratio and further allows the formation of a polystyrene resin foam having excellent long-term heat insulation properties and good appearance.

In the mixed foaming agent of the present invention, the blended amount of the hydrofluoroolefin is 0.030 mol or more and 0.125 mol or less based on 100 g of the styrene resin. When the blended amount of the hydrofluoroolefin is less than 0.030 mol based on 100 g of the styrene resin, an improvement effect of the heat insulation properties due to the hydrofluoroolefin cannot be expected. On the other hand, when the blended amount of the hydrofluoroolefin exceeds 0.125 mol based on 100 g of the styrene resin, the hydrofluoroolefin dissociates from a resin melted substance in extrusion foaming, which raises a possibility that a spot hole is formed in the surface of a foam or the closed cell ratio decreases. The blended amount of the hydrofluoroolefin is preferably 0.035 mol or more and 0.115 mol or less, more preferably 0.040 mol or more and 0.105 mol or less, and still more preferably 0.045 mol or more and 0.090 mol or less based on 100 g of the styrene resin.

Examples of the organic foaming agent include saturated hydrocarbons having 3 to 5 carbon atoms such as propane, normal butane, isobutane(2-methyl propane), and cyclopentane, ethers such as dimethylether, ethyl ether, diethylether, and methyl ethyl ether, alkyl chlorides such as methyl chloride and ethyl chloride, alcohols such as methanol, ethanol, propyl alcohol, isopropyl alcohol, butyl alcohol, sec-butyl alcohol, tert-butyl alcohol, aryl alcohol, crotyl alcohol, and propargyl alcohol, ketones, esters, and the like. Among the above, another organic foaming agent to be used in combination with the hydrofluoroolefin in the present invention is required to have a polystyrene permeability of $0.5 \times 10^{-10}$ cc·cm/cm$^2$·s·cm·Hg or more. Furthermore, the polystyrene permeability is more preferably $1.0 \times 10^{-10}$ cc·cm/cm$^2$·s·cm·Hg or more.

The organic foaming agents mentioned above have a high plasticization effect of the styrene resin and are required in order to foam a styrene resin melted substance containing a styrene resin, a foaming agent, a flame retardant, and other various additives with a proper viscosity to obtain a desired extruded foam. On the other hand, the flame retardancy is adversely affected, and therefore, by selecting an organic foaming agent which has a high polystyrene permeability and promptly dissipates after forming an extruded foam, excellent processability and foamability are obtained when producing an extruded foam and also excellent flame retardancy can be given to an extruded foam.

Other organic foaming agents to be used in combination with the hydrofluoroolefin in the present invention are not particularly limited insofar as the polystyrene permeability is $0.5 \times 10^{-10}$ cc·cm/cm$^2$·s·cm·Hg or more and are preferably ethers and alkyl chlorides because the plasticization effect of the styrene resin is high and the polystyrene permeability is high. Among the above, dimethylether, methyl chloride, and ethyl chloride are more preferable, and, in particular, dimethylether is particularly preferable because the polystyrene permeability is high and a load to the environment is low. These organic foaming agents can be used alone or as a mixture of two or more kinds thereof.

The polystyrene permeability of the foaming agent in the present invention is determined by JIS K 7126A method. For example, the polystyrene permeability can be measured by fixing a polystyrene resin film having a thickness of 50 to 100 μm produced by heating and melt-pressing a polystyrene resin (manufactured by PS Japan Corporation, Product Name "G9401") to a differential pressure type gas permeation device (manufactured by GTR Tec Corporation, GTR-31A) having a gas chromatograph (manufactured by Yanaco Analytical Systems Inc., G2700T), and then measuring the penetration amount by a differential pressure method under the conditions of a temperature of 23° C.±2° C. and a dry condition. An example of the polystyrene permeability of the foaming agent measured as described above is shown in Table 1.

TABLE 1

| Organic foaming agent | Polystyrene permeability × $10^{-10}$ cc · cm/cm$^2$ · s · cmHg |
| --- | --- |
| Propane | 0.030 |
| Normal butane | 0.015 |
| Isobutane | 0.005 |
| Dimethylether | 3.30 |
| Methyl chloride | 7.26 |
| Ethyl chloride | 1.00 |

The total blended amount of the hydrofluoroolefin and the other organic foaming agents is preferably 0.105 mol or more and 0.300 mol or less based on 100 g of the styrene resin and more preferably 0.115 mol or more and 0.200 mol or less based on 100 g of the styrene resin. When the total blended amount of the mixed foaming agent is less than 0.105 mol based on 100 g of the styrene resin, a styrene resin melted substance containing a styrene resin, a foaming agent, a flame retardant, other various additives, and the like is not imparted with a proper viscosity for obtaining a desired extruded foam in foaming, and only an extruded foam in which the closed cell ratio is less than 90% and/or the apparent density is high is obtained. When the total blended amount of the mixed foaming agent is larger than 0.300 mol based on 100 g of the styrene resin, defects, such as a void, may arise in a foam because the foaming agent is excessively contained.

Moreover, in the present invention, inorganic foaming agents, such as carbon dioxide and water, can be used as necessary in combination with the hydroolefin and the other organic foaming agents mentioned above. The inorganic foaming agents can be used alone or as a mixture of two or more kinds thereof. By the use of the inorganic foaming agents, a good plasticization effect and a good foaming assistant effect are obtained and the extrusion pressure is reduced, so that stable production of an extruded foam is achieved.

In the present invention, when water or alcohols is/are used as the other foaming agents, a water-absorbing substance is preferably used for stably performing extrusion foam molding. Specific examples of the water-absorbing substance for use in the present invention include water absorbing polymers such as polyacrylate polymers, starch-acrylic acid graft copolymers, polyvinyl alcohol polymers, vinyl alcohol-acrylate copolymers, ethylene-vinyl alcohol copolymers, acrylonitrile-methyl methacrylate-butadiene copolymers, polyethylene oxide copolymers, and derivatives thereof, and fine particles having a hydroxy group on the surface and having a particle size of 1,000 nm or less such as anhydrous silica (silicon dioxide) having a silanol group on the surface [for example, "AEROSIL" manufactured by Nippon Aerosil Co., Ltd. is commercially available]; water absorbable or water swellable layered silicates such as smectite and swellable fluorine mica, and organized products thereof; and porous substances such as zeolite, activated carbon, alumina, silica gel, porous glass, activated clay, diatomaceous earth, and bentonite. The addition amount of the water-absorbing substance is adjusted as appropriate depending on the addition amount of water and the like and is preferably 0.01 to 5 parts by weight and more preferably 0.1 to 3 parts by weight based on 100 parts by weight of the styrene resin.

The pressure in adding or injecting the foaming agent is not particularly limited and may be pressure higher than the internal pressure of an extruder or the like.

In the present invention, flame retardancy can be given to an extruded polystyrene foam to be obtained by blending a flame retardant in a proportion of 0.5 parts by weight or more and 8.0 parts by weight or less based on 100 parts by weight of the styrene resin. When the content of the flame retardant is less than 0.5 parts by weight, good characteristics as foams, such as flame retardancy, tend to be hard to obtain. On the other hand, when the content exceeds 8.0 parts by weight, the stability in producing foams, the surface properties, and the like are impaired in some cases. However, it is preferable to adjust the content of the flame retardant as appropriate in such a manner as to obtain the flame retardancy prescribed in JIS A9511, Measurement Method A according to the content of the foaming agent, the apparent density of a foam, and the type or the content of additives having a flame retardancy synergistic effect.

As the flame retardant, bromine-based flame retardants are preferably used. Specific examples of the bromine-based flame retardants in the present invention include hexabromocyclododecane, tetrabromobisphenol A-bis(2,3-dibromo-2-methylpropyl)ether, tetrabromobisphenol A-bis(2,3-dibromopropyl)ether, and tris(2,3-dibromopropyl)isocyanurate, and aliphatic bromine containing polymers such as a brominated styrene butadiene block copolymer. These substances may be used alone or as a mixture of two or more kinds thereof.

Among the above, a mixed bromine-based flame retardant containing tetrabromobisphenol A-bis(2,3-dibromo-2-methylpropyl)ether and tetrabromobisphenol A-bis(2,3-dibromopropyl)ether, hexabromocyclododecane, and a brominated styrene-butadiene block copolymer are preferably used because a good extrusion operation is achieved and the heat resistance of a foam is not adversely affected, for example. These substances may be used alone or as a mixture.

The content of the bromine-based flame retardant in the present invention is preferably 0.5 parts by weight or more and 6.0 parts by weight or less based on 100 parts by weight of the styrene resin, more preferably 1.0 part by weight or more and 5.0 parts by weight or less based on 100 parts by weight of the styrene resin, and still more preferably 1.5 parts by weight or more and 5.0 parts by weight or less. When the content of the bromine-based flame retardant is less than 0.5 parts by weight, good characteristics as foams, such as flame retardancy, tend to be hard to obtain. On the other hand, when the content exceeds 6.0 parts by weight, the stability in producing foams, the surface properties, and the like may be imp aired.

In the present invention, a radical generating agent can be used in combination for the purpose of increasing the flame retardancy performance of an extruded polystyrene foam. Specific examples of the radical generating agent include 2,3-dimethyl-2,3-diphenylbutane, poly-1,4-diisopropyl benzene, 2,3-diethyl-2,3-diphenyl butane, 3,4-dimethyl-3,4-diphenylhexane, 3,4-diethyl-3,4-diphenylhexane, 2,4-diphenyl-4-methyl-1-pentene, 2,4-diphenyl-4-ethyl-1-pentene, and the like. Peroxides, such as dicumyl peroxide, are also used. Among the above, those which are stable under a resin treatment temperature condition are preferable and specifically 2,3-dimethyl-2,3-diphenyl butane and poly-1,4-diisopropyl benzene are preferable. The addition amount is preferably 0.05 to 0.5 parts by weight based on 100 parts by weight of the styrene resin.

Furthermore, for the purpose of increasing the flame retardancy performance, phosphorus-based flame retardants, such as phosphate ester and phosphine oxide, can be used in combination insofar as the heat stability is not impaired. Examples of the phosphate ester include triphenyl phosphate, tricresyl phosphate, trixylenylphosphate, cresyl diphenylphosphate, 2-ethylhexyl diphenylphosphate, trimethyl phosphate, triethyl phosphate, tributyl phosphate, tris (2-ethylhexyl)phosphate, tris(butoxyethyl)phosphate, condensed phosphate ester, or the like, and triphenylphosphate and tris(tributylbromoneopentyl)phosphate are particularly preferable. As a phosphine oxide type phosphorus-based flame retardant, triphenylphosphine oxide is preferable. These phosphate esters and phosphine oxides may be used alone or in combination of two or more kinds thereof. The addition amount of the phosphorus-based flame retardant is preferably 0.1 to 2 parts by weight based on 100 parts by weight of the styrene resin.

In the present invention, resin and/or a stabilizer of a flame retardant can be used as necessary. Although not particularly limited, specific examples of the stabilizer include epoxy compounds such as a bisphenol A diglycidyl ether type epoxy resin, a cresol novolac type epoxy resin, and a phenol novolac type epoxy resin; polyhydric alcohol esters which are partial esters as reaction products of polyhydric alcohols such as pentaerythritol, dipentaerythritol, and tripentaerythritol, and monovalent carboxylic acids such as acetic acid and propionic acid, or divalent carboxylic acids such as adipic acid and glutamic acid, and which are mixtures of compounds having one or more hydroxyl groups in the molecules and contain a small amount of polyhydric alcohols as the raw materials in some cases; phenol stabilizers such as triethyleneglycol bis-3-(3-tert-butyl-4-hydroxy-5-methylphenyl)propionate, pentaerythritol tetrakis [3-(3',5'-di-tert-butyl-4'-hydroxyphenyl)propionate], octadecyl-3-(3,5-di-tert-butyl-4-hydroxyphenyl)propionate, and pentaerythritol tetrakis[3-(3',5'-di-tert-butyl-4'-hydroxyphenyl)propionate; phosphite stabilizers such as 3,9-bis(2,4-di-tert-butylphenoxy)-2,4,8,10-tetraoxa-3,9-diphosphaspiro[5.5]undecane, 3,9-bis(2,6-di-tert-butyl-4-methylphenoxy)-2,4,8,10-tetraoxa-3,9-diphosphaspiro[5.5] undecane, and tetrakis(2,4-di-tert-butyl-5-methylphenyl)-4,4'-biphenylene diphosphonite, are suitably used in terms of not reducing the flame retardancy performance of a foam and increasing the heat stability of a foam.

"Apparent Density"

In the extruded polystyrene foam according to the present invention, the apparent density of the extruded foam is preferably 20 kg/m$^3$ or more and 45 kg/m$^3$ or less and more preferably 25 kg/m$^3$ or more and 40 kg/m$^3$ or less from the viewpoint of, for example, the heat insulation properties and lightweight properties considering that the extruded polystyrene foam functions as heat insulating materials for construction or heat insulating materials for cooling boxes or refrigerating vehicles.

"Closed Cell Ratio"

The closed cell ratio of the extruded polystyrene foam of the present invention is preferably 90% or more and more preferably 95% or more. When the closed cell ratio is excessively low, there is a possibility that the hydrofluoroolefin used as a foaming agent easily dissipates from the extruded foam at the early stage, so that the long-term heat insulation properties decrease. In the present invention, the closed cell ratio (%) of the extruded foam is measured using an air comparison type pycnometer (for example, manufactured by Tokyo Science, Air comparison type pycnometer, Model: 1000 type) according to Procedure C of ASTM-D 2856-70.

With respect to the closed cell ratio of the extruded foam in the present invention, samples obtained by cutting the extruded foam into a size of 25 mm in length×25 mm in width×20 mm in thickness from three places in total in the vicinity of the central portion and both ends in the width direction of the extruded foam are used as test samples, each test sample is measured for the closed cell ratio by the following expression (1), and then the arithmetic mean value of the closed cell ratios of the three places is defined as the closed cell ratio of the extruded foam.

$$\text{Closed cell ratio (\%)} = (Vx - W/\rho) \times 100/(VA - W/\rho) \quad (1)$$

Vx: True volume of the sample measured by the air comparison type pycnometer (cm$^3$; Total of the capacity of resin configuring the sample of the extruded foam and the total capacity of all the cells of the closed cell portion in the sample.)
VA: Apparent volume of the sample calculated from the outside dimension of the sample (cm$^3$)
W: Total weight (g) of the sample
ρ: Density (g/cm$^3$) of the styrene resin configuring the extruded foam "Average Cell Diameter"

The average cell diameter ($D_T$) in the thickness direction of the extruded polystyrene foam of the present invention is preferably 0.5 mm or less and more preferably 0.05 to 0.3 mm from the viewpoint of heat insulation properties.

With respect to the average cell diameter ($D_T$: mm) in the thickness direction, straight lines over the total thickness of the extruded foam are drawn in the thickness direction on microscope magnified photographs of three portion in total of the central portion and both ends of a vertical cross section in the width direction, the average cell diameter (Length of the straight line/Number of the cells crossing the straight line) of the cells present on each straight line is determined from the length of each straight line and the number of cells crossing the straight lines, and then the arithmetic mean value of the determined average diameter of the three places is defined as the average cell diameter ($D_T$: mm) in the thickness direction.

With respect to the average cell diameter ($D_W$: mm) in the width direction, straight lines having a length obtained by multiplying 3 mm by the magnification are drawn in the width direction at the position where the extruded foam are bisected in the thickness direction on microscope magnified photographs of three portions in total of the central portion and both ends of a vertical cross section in the width direction, the average diameter of the cells present on each straight line is determined from the straight lines and the number of the cells crossing the straight lines by Expression [3 mm/(Number of the cells crossing the straight line−1)], and then the arithmetic mean value of the determined average diameter of the three places is defined as the average cell diameter ($D_W$: mm) in the width direction.

With respect to the average cell diameter ($D_L$: mm) in the extrusion direction, straight lines having a length obtained by multiplying 3 mm by the magnification are drawn in the extrusion direction at the position where the extruded foam is bisected in the thickness direction on microscope magnified photographs of three portions at an interval of 1 m of a vertical cross section in the extrusion direction obtained by cutting the extruded foam in the extrusion direction at a position where the width direction of the extruded foam is bisected, the average diameter of the cells present on each straight line is determined from the straight lines and the number of the cells crossing the straight lines by Expression [3 mm/(Number of the cells crossing the straight line−1)], and then the arithmetic mean value of the determined average diameter of the three places is defined as the average cell diameter ($D_L$: mm) in the extrusion direction. The average cell diameter ($D_H$: mm) in the horizontal direction of the extruded foam is an arithmetical mean value of $D_W$ and $D_L$.

"Cell Deformation Ratio"

In the extruded polystyrene foam of the present invention, the cell deformation ratio is preferably 0.7 to 2.0. The cell deformation ratio is a value ($D_T/D_H$) obtained by dividing the average cell diameter ($D_T$: mm) in the thickness direction determined by the above-described measurement method by the average cell diameter ($D_H$: mm) in the horizontal direction of the extruded foam. When the cell deformation ratio is smaller than 1, the cells are more flat. When the cell deformation ratio is larger than 1, the cells are vertically longer. When the cell deformation ratio is excessively small, the cells are flat, so that the compressive strength tends to decrease and the flat cells have a strong tendency of returning to a spherical shape, and therefore the dimensional stability of the extruded foam also tends to decrease. When the cell deformation ratio is excessively large, the number of cells in the thickness direction decreases, so that an effect of improving the heat insulation properties by the cell shape is lowered. Therefore, the cell deformation ratio is more preferably 0.8 to 1.5 and still more preferably 0.8 to 1.2. When the cell deformation ratio is within the ranges mentioned above, an extruded polystyrene foam having excellent mechanical strength and high heat insulation properties is obtained.

"Thermal Conductivity"

The thermal conductivity (A) after the passage of 100 days after the production of the extruded polystyrene foam of the present invention is desirably 0.0290 W/(m·K) or less and more preferably 0.0280 W/(m·K) or less. The extruded polystyrene foam of the present invention has a high closed cell ratio and is effectively prevented from dissipation of hydrofluoroolefin from the foam. Therefore, even after the passage of 100 days after the production, the thermal conductivity is maintained low and the heat insulation properties are excellent.

In the present invention, the thermal conductivity is measured by a method according to an accelerating test described in ISO 11561. A test piece not having a molded skin of 10 mm in thickness×200 mm in length×200 mm in width is cut out from the central portion in the thickness direction and in the width direction of the extruded foam immediately after the production, and then the test piece is allowed to stand still under the standard temperature condition, Third class (23° C.±5° C.) and the standard humidity condition, Third class ($50^{+20}$, $^{-10}$% R.H.) prescribed in JIS K 7100. After the passage of 100 days after the production, the thermal conductivity is measured using the test piece under a temperature condition of an average temperature of 23° C. by a method according to JIS A 1412-2:1999.

As described above, in order to adjust the thermal conductivity after the passage of 100 days after the production of the extruded polystyrene foam to 0.0280 W/(m·K) or less, the blended amount of the hydrofluoroolefin and the apparent density, the closed cell ratio, the average cell diameter, and the cell deformation ratio of the extruded foam may be adjusted within the ranges specified in the present invention.

In the present invention, graphite may be added as a heat ray radiation suppressor for improving insulation properties. The heat ray radiation suppressor refers to a substance having a property of reflecting, scattering, and absorbing light in the near infrared region or the infrared region (for example, wavelength band of about 800 to 3000 nm). By adding the heat ray radiation suppressor, a foam having high heat insulation properties is obtained. As the heat ray radiation suppressor usable in the present invention, white particles such as titanium oxide, barium sulfate, zinc oxide, aluminum oxide, and antimony oxide can be used in combination besides graphite. These substances may be used alone or in combination of two or more kinds thereof. Among the above, from the respect that the ray radiation control effect is high, titanium oxide and barium sulfate are preferable and titanium oxide is more preferable.

The content of the heat ray radiation suppressor in the present invention is preferably 1.0 part by weight or more and 6.0 parts by weight or less and more preferably 2.0 parts by weight or more and 5.0 parts by weight or less based on 100 parts by weight of the styrene resin. When the content of the heat ray radiation suppressor is less than 1.0 part by weight, an improvement of insulation properties is hard to achieve. On the other hand, when the content of the heat ray radiation suppressor exceeds 6.0 parts by weight, the extrusion stability and the moldability tend to be poor or the flammability tends to be impaired.

In the present invention, the styrene resin may further contain additives, for example, inorganic compounds such as silica, calcium silicate, wollastonite, kaolin, clay, mica, zinc oxide, titanium oxide, and calcium carbonate, processing aids such as sodium stearate, calcium stearate, magnesium stearate, barium stearate, liquid paraffin, olefin wax, and a stearyl amide compound, a phenol antioxidant, light-fastness stabilizers such as a phosphorus-based stabilizer, a nitrogen stabilizer, a sulfur stabilizer, benzotriazoles, and hindered amines, flame retardants other than the substances mentioned above, an antistatic agent, colorants such as a pigment, as necessary, insofar as the effects of the present invention are not imp aired.

As a procedure of adding various additives to the styrene resin, a procedure is mentioned, for example, which includes adding various additives to the styrene resin and mixing, supplying the mixture to an extruder, heating and melting the mixture, and then further adding a foaming agent. The timing of adding the various additives to the styrene resin and kneading time are not particularly limited.

A method for producing the extruded polystyrene foam of the present invention includes supplying styrene resin, a flame retardant, other additives, and the like to a heating and melting unit such as an extruder, adding a foaming agent to the styrene resin under high-pressure conditions at an arbitrary stage to form a liquid gel, cooling the liquid gel to a temperature suitable for extrusion foaming, and then extrusion foaming the liquid gel to a low-pressure region through a die to form a foam.

The heating temperature may be equal to or higher than the temperature at which the styrene resin to be used melts and is preferably a temperature at which molecular deterioration of the resin under the influence of the additives and the like is suppressed as much as possible, for example, about 150 to 260° C. The melting and kneading time varies depending on the extrusion amount of the styrene resin per unit time and the type of the extruder to be used as the melting and kneading unit and cannot be uniquely specified and is set as appropriate as the time required for uniformly dispersing and mixing the styrene resin and the foaming agent or the additives.

As the melting and kneading unit, a screw type extruder and the like are mentioned, for example. However, the melting and kneading unit is not particularly limited insofar as it is used for usual extrusion foaming.

As a foam molding method of the present invention, a method is used, for example, which includes molding an extruded foam obtained through a slit die for use in extrusion molding having an opening of a linear slit shape by opening the same from a high-pressure region to a low-pressure region into a board-shaped foam having a large cross-sectional area using a molding the disposed closely contacting or contacting the slit die, a molding roll disposed adjacent to the downstream side of the molding die, or the like. By adjusting the liquid surface shape of the molding the and adjusting the die temperature, a desired cross-sectional shape of a foam, desired surface properties of a foam, and a desired foam quality are obtained.

The thickness in the extruded polystyrene foam according to the present invention is not particularly limited and is preferably 10 mm or more and 150 mm or less, more preferably 15 mm or more and 120 mm or less, and particularly preferably 20 mm or more and 100 mm or less, for example, from the viewpoint of heat insulation properties, bending strength, and compressive strength considering that the extruded polystyrene foam functions as heat insulating materials for construction or heat insulating materials for cooling boxes or refrigerating vehicles.

Thus, the present invention can easily provide an extruded polystyrene foam which is lightweight and has excellent heat insulation properties and flame retardancy and has an ozone depletion potential of 0 and a low global warming potential, and thus is friendly to the environment.

EXAMPLES

Hereinafter, Examples of the present invention are described. It is a matter of course that the present invention is not limited to Examples described below.

Raw materials used in Examples and Comparative Examples are as follows.

Base Material Resin

Styrene resin A [manufactured by PS Japan Corporation, G9401; MFR of 2.2 g/10 minutes]

Styrene resin B [manufactured by PS Japan Corporation, 680; MFR of 7.0 g/10 minutes]

Flame Retardant

Mixed bromine-based flame retardant of tetrabromobisphenol A-bis(2,3-dibromo-2-methylpropyl)ether and tetrabromobisphenol A-bis(2,3-dibromopropyl)ether [manufactured by Daiichi Kogyo Co., Ltd., GR-125P]

Brominated styrene-butadiene block polymer [manufactured by Chemtura Corporation, EMERALD INNOVATION #3000]

Hexabromocyclododecane [manufactured by Albemarle Corporation, HP900]

Flame Retardant Assistant

Tris(tribromoneopentyl)phosphate [manufactured by Daihachi Chemical Industry Co., Ltd., CR-900]

Triphenylphosphine oxide [Sumitomo Shoji Chemicals Co., Ltd.]

Radical Generating Agent

Poly-1,4-diisopropylbenzene [manufactured by UNITED INITIATORS, CCPIB]

Stabilizer

Bisphenol-A-glycidylether [manufactured by ADEKA Corporation, EP-13]

Cresol novolac type epoxy resin [manufactured by Huntsman Japan KK, ECN-1280]

Dipentaerythritol-adipic acid reaction mixture [manufactured by Ajinomoto Fine-Techno Co., Inc., Plenlizer ST210]

Pentaerythritol tetrakis [3-(3',5'-di-tert-butyl-4'-hydroxyphenyn propionate] [manufactured by Chemtura Corporation, ANOX20]

3,9-bis(2,4-di-tert-butylphenoxy)-2,4,8,10-tetraoxa-3,9-diphosphaspiro[5.5]undecane [manufactured by Chemtura Corporation, Ultranox626]

Triethyleneglycol bis-3-(3-tert-butyl-4-hydroxy 5-methylphenyl) propionate [manufactured by Songwon Japan, SONGNOX 2450FF]

Other Additives

Calcium stearate [manufactured by Sakai Chemical Industry Co., Ltd., SC-P]

Bentonite [Hojun., Co. Ltd., Bengel Bright K11]

Silica [manufactured by Evonik Degussa Japan Co., Ltd., Carplex BS-304F]

Foaming Agent

HFO-1234ze [manufactured by Honeywell Japan Inc.]

Diemethyl ether [manufactured by Iwatani Corporation]

Methyl chloride [manufactured by Asahi Glass Co., Ltd.]

Ethyl chloride [manufactured by Nittoku Chemicals]

Isobutane [manufactured by Mitsui Chemicals, Inc.]

Normal butane [manufactured by Iwatani Corporation]

Water [Tap water of Settsu-shi, Osaka-fu]

Examples and Comparative Examples were evaluated for the apparent density, the closed cell ratio, the average cell diameter, the cell deformation ratio, the remaining amount of HFO-1234ze based on 100 g of the styrene resin in the foam, the thermal conductivity, and the JIS flammability according to the following techniques.

(1) Apparent Density (Kg/m$^3$)

The weight of the obtained extruded polystyrene foam was measured and also the length size, the width size, and the thickness size were measured.

The apparent density of the foam was determined from the weight and each size measured above according to the following expression, and then the unit was converted to kg/m$^3$.

$$\text{Apparent density (g/cm}^3\text{)=Foam weight (g)/Foam volume (cm}^3\text{)}$$

(2) Closed Cell Ratio (%)

A test piece not having a molded skin of 20 mm in thickness×25 mm in length×25 mm in width was cut out from the obtained extruded polystyrene foam and then evaluated according to Procedure C of ASTM-D 2856-70.

(3) Average Cell Diameter (Mm)

The evaluation was performed as described above.

(4) Cell Deformation Ratio

The evaluation was performed as described above.

(5) Remaining Amount of HFO-1234ze Based on 100 g of Styrene Resin in Extruded Foam The obtained extruded polystyrene foam was allowed to stand still under the conditions of the standard temperature condition, Third class (23° C.±5° C.) and the standard humidity condition, Third class (50$^{+20}$, $^{-10}$% R.H.) specified in JIS K 7100. After the passage of 28 days after the production, the remaining amount of HFO-1234ze was evaluated by the following facilities and procedure.

a) Used apparatus; Gas chromatograph GC-2014 [manufactured by Shimadzu Corporation]

b) Used column; G-Column G-950 25UM [manufactured by Chemicals Evaluation and Research Institute]

c) Measurement conditions;

Inlet temperature: 65° C.

Column temperature: 80° C.

Detector temperature: 100° C.

Carrier gas: High purity helium

Carrier gas flow rate: 30 mL/min.

Detector: TCD

Current: 120 mA

About 1.2 g of the test piece, which varied depending on the apparent density, cut out from the foam, was placed in a glass container (hereinafter referred to as an "airtight container") capable of sealing about 130 cc, and then the air in the airtight container was removed using a vacuum pump. Thereafter, the airtight container was heated at 170° C. for 10 minutes, and then the foaming agent in the foam was extracted in the airtight container. After the temperature of the airtight container returned to normal temperature, helium was introduced into the airtight container to return the pressure to the atmospheric pressure. Then, 40 μL of the mixed gas containing HFO-1234ze was extracted by a micro-syringe, and then evaluated with the used apparatus and the measurement conditions of a) to c) above.

(6) Thermal Conductivity (W/mK)

The thermal conductivity of the foam was measured by the method described above. The criteria for success/failure are as follows.

Success: Thermal conductivity is 0.0280 W/mK or less.

Failure: Thermal conductivity is larger than 0.0280 W/mK.

(7) JIS Flammability

The evaluation was performed using 5 test pieces of 10 mm in thickness×200 mm in length×25 mm in width according to JIS A 9511 (Measurement method A) based on the following criteria. The measurement was performed as follows. After the production of the extruded polystyrene foam, the extruded polystyrene foam was cut into test pieces of the dimension mentioned above, and then allowed to stand still under the conditions of the standard temperature condition, Third class (23° C.±5° C.) and the standard humidity condition, Third class ($50^{+20}$, $^{-10}$% R.H.) specified in JIS K 7100. After the passage of 1 week after the production, the evaluation was performed.

○ (Success): Satisfy the standard that flame was extinguished within 3 seconds, afterglow did not occur, and burning exceeding the burning limit indication line did not occur.

x (Failure): Not satisfy the standard.

Example 1

[Production of Resin Mixture]

Based on 100 parts by weight of the styrene resin A [manufactured by PS Japan Corporation, G9401], 3.0 parts by weight of a mixed bromine-based flame retardant [manufactured by Daiichi Kogyo Co., Ltd., GR-125P] of tetrabromobisphenol A-bis(2,3-dibromo-2-methylpropyl)ether and tetrabromobisphenol A-bis(2,3-dibromopropyl)ether as a flame retardant, 1.0 part by weight of a triphenylphosphine oxide [Sumitomo Shoji Chemicals Co., Ltd.] as a flame retardant assistant, 0.10 parts by weight of bisphenol A-glycidyl ether [manufactured by ADEKA Corporation, EP-13] and 0.20 parts by weight of triethyleneglycol bis-3-(3-tert-butyl-4-hydroxy-5-methylphenyl)propionate [manufactured by Songwon Japan, SONGNOX 2450FF] as a stabilizer, and 0.10 parts by weight of calcium stearate [manufactured by Sakai Chemical Industry Co., Ltd., SC-P] as a lubricant were dry-blended.

[Production of Extruded Foam]

The obtained resin mixture was supplied at about 50 kg/hr to an extruder in which a single screw extruder (first extruder) with an opening diameter of 65 mm, a single screw extruder (second extruder) with an opening diameter of 90 mm, and a cooling machine are connected in series.

The resin mixture supplied to the first extruder was heated to a resin temperature of 240° C. to be melted or plasticized and kneaded, and then 4.0 parts by weight (0.035 mol) of HFO-1234ze and 4.7 parts by weight (0.102 mol) of dimethylether as the foaming agent (based on 100 parts by weight of the styrene resin) were pressed into the resin near the tip of the first extruder. Thereafter, the resin temperature was reduced to 125° C. in the second extruder connected to the first extruder and the cooling machine, and then the resin mixture was extrusion foamed into the atmosphere at a foaming pressure of 8.0 MPa from a mouthpiece (slit die) having a rectangular cross section of 1.2 mm in thickness× 50 mm in width provided at the tip of the cooling machine to give an extruded foam board having a cross-sectional shape of 21 mm in thickness×250 mm in width by a molding die disposed closely contacting the mouthpiece and a molding roll disposed on the downstream side thereof.

The evaluation results of the obtained foam are shown in Table 2.

Examples 2 to 12

Foams were obtained by the same operation as that of Example 1 except changing the type and the addition amount of blending ingredients and the production conditions as shown in Table 2. The physical properties of the obtained foams are shown in Table 2.

TABLE 2

|  |  |  |  | Example 1 | Example 2 | Example 3 | Example 4 | Example 5 | Example 6 |
|---|---|---|---|---|---|---|---|---|---|
| Formula | Base resin | G9401 | parts by weight | 100 | 100 | 100 | 100 | 100 | 100 |
|  |  | 680 | parts by weight | 0 | 0 | 0 | 0 | 0 | 0 |
|  | Flame retardant | GR-125P | parts by weight | 3.0 | 3.0 | 3.0 | 3.0 | 3.0 | 3.0 |
|  |  | EMERALD INNOVATION #3000 | parts by weight | 0 | 0 | 0 | 0 | 0 | 0 |
|  |  | HBCD (HP900) | parts by weight | 0 | 0 | 0 | 0 | 0 | 0 |
|  | Stabilizer | EP-13 | parts by weight | 0.10 | 0.10 | 0.10 | 0.10 | 0.10 | 0.10 |
|  |  | ECN-1280 | parts by weight | 0 | 0 | 0 | 0 | 0 | 0 |
|  |  | Plenlizer ST210 | parts by weight | 0 | 0 | 0 | 0 | 0 | 0 |
|  |  | ANOX20 | parts by weight | 0 | 0 | 0 | 0 | 0 | 0 |
|  |  | Utranox626 | parts by weight | 0 | 0 | 0 | 0 | 0 | 0 |
|  |  | SONGNOX 2450FF | parts by weight | 0.20 | 0.20 | 0.20 | 0.20 | 0.20 | 0.20 |
|  | Flame retardant assistant | Triphenylphosphine oxide | parts by weight | 1.0 | 1.0 | 1.0 | 1.0 | 1.0 | 1.0 |
|  |  | CCPIB | parts by weight | 0 | 0 | 0 | 0 | 0 | 0 |
|  |  | CR-900 | parts by weight | 0 | 0 | 0 | 0 | 0 | 0 |
|  | Foaming agent | HFO-1234ze | parts by weight | 4.0 | 6.0 | 8.0 | 8.0 | 8.0 | 8.0 |
|  |  | Isobutane | parts by weight | 0 | 0 | 0 | 0 | 0 | 0 |
|  |  | Normal butane | parts by weight | 0 | 0 | 0 | 0 | 0 | 0 |
|  |  | Dimethyl ether | parts by weight | 4.7 | 4.0 | 3.2 | 2.7 | 5.0 | 0 |
|  |  | Methyl chloride | parts by weight | 0 | 0 | 0 | 0 | 0 | 3.5 |
|  |  | Ethyl chloride | parts by weight | 0 | 0 | 0 | 0 | 0 | 0 |
|  |  | Water | parts by weight | 0 | 0 | 0 | 0 | 0 | 0 |
|  | Blended amount of foaming agent (Based on 100 g of styrene resin) | HFO-1234ze | mol | 0.035 | 0.053 | 0.070 | 0.070 | 0.070 | 0.070 |
|  |  | Isobutane | mol | 0 | 0 | 0 | 0 | 0 | 0 |
|  |  | Normal butane | mol | 0 | 0 | 0 | 0 | 0 | 0 |
|  |  | Dimethyl ether | mol | 0.102 | 0.087 | 0.069 | 0.059 | 0.109 | 0 |
|  |  | Methyl chloride | mol | 0 | 0 | 0 | 0 | 0 | 0.069 |
|  |  | Ethyl chloride | mol | 0 | 0 | 0 | 0 | 0 | 0 |
|  |  | Total | mol | 0.137 | 0.139 | 0.140 | 0.129 | 0.179 | 0.139 |
|  | Lubricant | SC-P | parts by weight | 0.10 | 0.10 | 0.10 | 0.10 | 0.10 | 0.10 |
|  | Water absorbing medium | Bengel Bright K11 | parts by weight | 0 | 0 | 0 | 0 | 0 | 0 |
|  |  | Carplex BS-304F | parts by weight | 0 | 0 | 0 | 0 | 0 | 0 |

TABLE 2-continued

|  |  |  |  |  |  |  |  |  |
|---|---|---|---|---|---|---|---|---|
| Production conditions | Foaming temperature | ° C. | 125 | 124 | 126 | 125 | 125 | 126 |
|  | Die pressure | MPa | 8.0 | 8.2 | 8.0 | 7.9 | 8.1 | 8.0 |
| Physical properties of extruded foam | Apparent density | kg/m$^3$ | 35 | 35 | 35 | 35 | 35 | 35 |
|  | Closed cell ratio | % | 95 | 96 | 96 | 95 | 95 | 96 |
|  | Average cell diameter | mm | 0.1 | 0.1 | 0.1 | 0.1 | 0.1 | 0.1 |
|  | Cell deformation ratio | — | 1.0 | 1.0 | 1.0 | 1.0 | 1.0 | 1.0 |
|  | Remaining amount of HFO-1234ze based on 100 g of styrene resin in extruded foam (After passage of 28 days after production) | mol | 0.032 | 0.050 | 0.068 | 0.068 | 0.068 | 0.068 |
|  | Thermal conductivity (After passage of 100 days after production) | W/mK | 0.0277 | 0.0272 | 0.0267 | 0.0266 | 0.0268 | 0.0268 |
|  | JIS flammability | — | ○ | ○ | ○ | ○ | ○ | ○ |

|  |  |  |  | Example 7 | Example 8 | Example 9 | Example 10 | Example 11 | Example 12 |
|---|---|---|---|---|---|---|---|---|---|
| Formula | Base resin | G9401 | parts by weight | 100 | 100 | 100 | 100 | 0 | 100 |
|  |  | 680 | parts by weight | 0 | 0 | 0 | 0 | 100 | 0 |
|  | Flame retardant | GR-125P | parts by weight | 3.0 | 3.0 | 1.0 | 5.0 | 0 | 0 |
|  |  | EMERALD INNOVATION #3000 | parts by weight | 0 | 0 | 0 | 0 | 3.0 | 0 |
|  |  | HBCD (HP900) | parts by weight | 0 | 0 | 0 | 0 | 0 | 3.0 |
|  | Stabilizer | EP-13 | parts by weight | 0.10 | 0.10 | 0.10 | 0.10 | 0.15 | 0.10 |
|  |  | ECN-1280 | parts by weight | 0 | 0 | 0 | 0 | 0.15 | 0 |
|  |  | Plenlizer ST210 | parts by weight | 0 | 0 | 0 | 0 | 0.20 | 0 |
|  |  | ANOX20 | parts by weight | 0 | 0 | 0 | 0 | 0.30 | 0 |
|  |  | Utranox626 | parts by weight | 0 | 0 | 0 | 0 | 0.015 | 0 |
|  |  | SONGNOX 2450FF | parts by weight | 0.20 | 0.20 | 0.20 | 0.20 | 0 | 0.20 |
|  | Flame retardant assistant | Triphenylphosphine oxide | parts by weight | 1.0 | 1.0 | 1.0 | 1.0 | 0.50 | 0 |
|  |  | CCPIB | parts by weight | 0 | 0 | 0 | 0 | 0.10 | 0 |
|  |  | CR-900 | parts by weight | 0 | 0 | 0 | 0 | 0 | 1.0 |
|  | Foaming agent | HFO-1234ze | parts by weight | 8.0 | 8.0 | 8.0 | 8.0 | 8.0 | 8.0 |
|  |  | Isobutane | parts by weight | 0 | 0 | 0 | 0 | 0 | 0 |
|  |  | Normal butane | parts by weight | 0 | 0 | 0 | 0 | 0 | 0 |
|  |  | Dimethyl ether | parts by weight | 0 | 3.3 | 3.2 | 3.2 | 3.2 | 3.2 |
|  |  | Methyl chloride | parts by weight | 0 | 0 | 0 | 0 | 0 | 0 |
|  |  | Ethyl chloride | parts by weight | 4.6 | 0 | 0 | 0 | 0 | 0 |
|  |  | Water | parts by weight | 0 | 0.7 | 0 | 0 | 0 | 0 |
|  | Blended amount of foaming agent (Based on 100 g of styrene resin) | HFO-1234ze | mol | 0.070 | 0.070 | 0.070 | 0.070 | 0.070 | 0.070 |
|  |  | Isobutane | mol | 0 | 0 | 0 | 0 | 0 | 0 |
|  |  | Normal butane | mol | 0 | 0 | 0 | 0 | 0 | 0 |
|  |  | Dimethyl ether | mol | 0 | 0.072 | 0.069 | 0.069 | 0.069 | 0.069 |
|  |  | Methyl chloride | mol | 0 | 0 | 0 | 0 | 0 | 0 |
|  |  | Ethyl chloride | mol | 0.071 | 0 | 0 | 0 | 0 | 0 |
|  |  | Total | mol | 0.141 | 0.142 | 0.140 | 0.140 | 0.140 | 0.140 |
|  | Lubricant | SC-P | parts by weight | 0.10 | 0.10 | 0.10 | 0.10 | 0.10 | 0.10 |
|  | Water absorbing medium | Bengel Bright K11 | parts by weight | 0 | 0.40 | 0 | 0 | 0 | 0 |
|  |  | Carplex BS-304F | parts by weight | 0 | 0.40 | 0 | 0 | 0 | 0 |
| Production conditions | Foaming temperature | | ° C. | 124 | 122 | 125 | 126 | 120 | 125 |
|  | Die pressure | | MPa | 8.0 | 8.0 | 8.1 | 8.1 | 8.0 | 7.9 |
| Physical properties of extruded foam | Apparent density | | kg/m$^3$ | 35 | 35 | 35 | 35 | 35 | 35 |
|  | Closed cell ratio | | % | 95 | 95 | 97 | 95 | 96 | 95 |
|  | Average cell diameter | | mm | 0.1 | 0.1 | 0.1 | 0.1 | 0.1 | 0.1 |
|  | Cell deformation ratio | | — | 1.0 | 1.0 | 1.0 | 1.0 | 1.0 | 1.0 |
|  | Remaining amount of HFO-1234ze based on 100 g of styrene resin in extruded foam (After passage of 28 days after production) | | mol | 0.068 | 0.068 | 0.068 | 0.068 | 0.068 | 0.068 |
|  | Thermal conductivity (After passage of 100 days after production) | | W/mK | 0.0265 | 0.0268 | 0.0266 | 0.0266 | 0.0268 | 0.0269 |
|  | JIS flammability | | — | ○ | ○ | ○ | ○ | ○ | ○ |

Comparative Examples 1 to 7

Foams were obtained by the same operation as that of Example 1 except changing the type and the addition amount of blending ingredients and the production conditions as shown in Table 3. The physical properties of the obtained foam are shown in Table 3.

TABLE 3

|  |  |  |  | Comparative Example 1 | Comparative Example 2 | Comparative Example 3 | Comparative Example 4 |
|---|---|---|---|---|---|---|---|
| Formula | Base resin | G9401 | parts by weight | 100 | 100 | 100 | 100 |
|  |  | 680 | parts by weight | 0 | 0 | 0 | 0 |
|  | Flame retardant | GR-125P | parts by weight | 3.0 | 3.0 | 3.0 | 3.0 |
|  |  | EMERALD INNOVATION #3000 | parts by weight | 0 | 0 | 0 | 0 |
|  |  | HBCD (HP900) | parts by weight | 0 | 0 | 0 | 0 |
|  | Stabilizer | EP-13 | parts by weight | 0.10 | 0.10 | 0.10 | 0.10 |
|  |  | ECN-1280 | parts by weight | 0 | 0 | 0 | 0 |
|  |  | Plenlizer ST210 | parts by weight | 0 | 0 | 0 | 0 |
|  |  | ANOX20 | parts by weight | 0 | 0 | 0 | 0 |
|  |  | Ultranox626 | parts by weight | 0 | 0 | 0 | 0 |
|  |  | SONGNOX 2450FF | parts by weight | 0.20 | 0.20 | 0.20 | 0.20 |
|  | Flame retardant assistant | Triphenylphosphine oxide | parts by weight | 1.0 | 1.0 | 1.0 | 1.0 |
|  |  | CCPIB | parts by weight | 0 | 0 | 0 | 0 |
|  |  | CR-900 | parts by weight | 0 | 0 | 0 | 0 |
|  | Foaming agent | HFO-1234ze | parts by weight | 8.0 | 8.0 | 2.6 | 15.0 |
|  |  | Isobutane | parts by weight | 4.1 | 0 | 0 | 0 |
|  |  | Normal butane | parts by weight | 0 | 4.1 | 0 | 0 |
|  |  | Dimethyl ether | parts by weight | 0 | 0 | 5.2 | 0.6 |
|  |  | Methyl chloride | parts by weight | 0 | 0 | 0 | 0 |
|  |  | Ethyl chloride | parts by weight | 0 | 0 | 0 | 0 |
|  |  | Water | parts by weight | 0 | 0 | 0 | 0 |
|  | Blended amount of foaming agent (Based on 100 g of styrene resin) | HFO-1234ze | mol | 0.070 | 0.070 | 0.023 | 0.132 |
|  |  | Isobutane | mol | 0.071 | 0 | 0 | 0 |
|  |  | Normal butane | mol | 0 | 0.071 | 0 | 0 |
|  |  | Dimethyl ether | mol | 0 | 0 | 0.113 | 0.013 |
|  |  | Methyl chloride | mol | 0 | 0 | 0 | 0 |
|  |  | Ethyl chloride | mol | 0 | 0 | 0 | 0 |
|  |  | Total | mol | 0.141 | 0.141 | 0.136 | 0.145 |
|  | Lubricant | SC-P | parts by weight | 0.10 | 0.10 | 0.10 | 0.10 |
|  | Water absorbing medium | Bengel Bright K11 | parts by weight | 0 | 0 | 0 | 0 |
|  |  | Carplex BS-304F | parts by weight | 0 | 0 | 0 | 0 |
| Production conditions | Foaming temperature |  | ° C. | 125 | 126 | 126 | 125 |
|  | Die pressure |  | MPa | 8.0 | 8.1 | 8.0 | 8.0 |
| Physical properties of extruded foam | Apparent density |  | kg/m³ | 35 | 35 | 35 | Generation of a large amount of spot holes Uncollectable due to poor molding |
|  | Closed cell ratio |  | % | 96 | 95 | 99 |  |
|  | Average cell diameter |  | mm | 0.1 | 0.1 | 0.1 |  |
|  | Cell deformation ratio |  | — | 1.0 | 1.0 | 1.0 |  |
|  | Remaining amount of HFO-1234ze based on 100 g of styrene resin in extruded foam (After passage of 28 days after production) |  | mol | 0.068 | 0.068 | 0.020 |  |
|  | Thermal conductivity (After passage of 100 days after production) |  | W/mK | 0.0271 | 0.0269 | 0.0283 |  |
|  | JIS flammability |  | — | x | x | ○ |  |

|  |  |  |  | Comparative Example 5 | Comparative Example 6 | Comparative Example 7 |
|---|---|---|---|---|---|---|
| Formula | Base resin | G9401 | parts by weight | 100 | 100 | 100 |
|  |  | 680 | parts by weight | 0 | 0 | 0 |
|  | Flame retardant | GR-125P | parts by weight | 3.0 | 3.0 | 8.0 |
|  |  | EMERALD INNOVATION #3000 | parts by weight | 0 | 0 | 0 |
|  |  | HBCD (HP900) | parts by weight | 0 | 0 | 0 |
|  | Stabilizer | EP-13 | parts by weight | 0.10 | 0.10 | 0.10 |
|  |  | ECN-1280 | parts by weight | 0 | 0 | 0 |
|  |  | Plenlizer ST210 | parts by weight | 0 | 0 | 0.10 |
|  |  | ANOX20 | parts by weight | 0 | 0 | 0 |
|  |  | Ultranox626 | parts by weight | 0 | 0 | 0 |
|  |  | SONGNOX 2450FF | parts by weight | 0.20 | 0.20 | 0.20 |
|  | Flame retardant assistant | Triphenylphosphine oxide | parts by weight | 1.0 | 1.0 | 1.0 |
|  |  | CCPIB | parts by weight | 0 | 0 | 0 |
|  |  | CR-900 | parts by weight | 0 | 0 | 0 |

TABLE 3-continued

| | | | | | | |
|---|---|---|---|---|---|---|
| | Foaming agent | HFO-1234ze | parts by weight | 8.0 | 8.0 | 8.0 |
| | | Isobutane | parts by weight | 0 | 0 | 0 |
| | | Normal butane | parts by weight | 0 | 0 | 0 |
| | | Dimethyl ether | parts by weight | 0 | 1.5 | 3.2 |
| | | Methyl chloride | parts by weight | 0 | 0 | 0 |
| | | Ethyl chloride | parts by weight | 0 | 0 | 0 |
| | | Water | parts by weight | 0 | 0 | 0 |
| | Blended amount of foaming agent (Based on 100 g of styrene resin) | HFO-1234ze | mol | 0.070 | 0.070 | 0.070 |
| | | Isobutane | mol | 0 | 0 | 0 |
| | | Normal butane | mol | 0 | 0 | 0 |
| | | Dimethyl ether | mol | 0 | 0.033 | 0.069 |
| | | Methyl chloride | mol | 0 | 0 | 0 |
| | | Ethyl chloride | mol | 0 | 0 | 0 |
| | | Total | mol | 0.070 | 0.103 | 0.140 |
| | Lubricant | SC-P | parts by weight | 0.10 | 0.10 | 0.10 |
| | Water absorbing medium | Bengel Bright K11 | parts by weight | 0 | 0 | 0 |
| | | Carplex BS-304F | parts by weight | 0 | 0 | 0 |
| Production conditions | Foaming temperature | | °C. | 126 | 126 | 125 |
| | Die pressure | | MPa | 8.0 | 7.9 | 7.9 |
| Physical properties of extruded foam | Apparent density | | kg/m$^3$ | 51 | 43 | Uncollectable due to poor molding |
| | Closed cell ratio | | % | 76 | 82 | |
| | Average cell diameter | | mm | 0.1 | 0.1 | |
| | Cell deformation ratio | | — | 1.0 | 1.0 | |
| | Remaining amount of HFO-1234ze based on 100 g of styrene resin in extruded foam (After passage of 28 days after production) | | mol | 0.068 | 0.068 | |
| | Thermal conductivity (After passage of 100 days after production) | | W/mK | 0.0304 | 0.0296 | |
| | JIS flammability | | — | ◯ | ◯ | |

As is clear from the comparison between Examples 1 to 12 shown in Table 2 and Comparative Examples 1 to 7 shown in Table 3, by extrusion foam molding of a styrene resin containing predetermined amounts of a flame retardant and a mixed foaming agent in accordance with the present invention, an extruded polystyrene foam which is lightweight and has excellent heat insulation properties and flame retardancy and has an ozone depletion potential of 0 and a low global warming potential, and thus is friendly to the environment can be obtained.

The invention claimed is:

1. An extruded polystyrene foam, comprising:
a polystyrene resin, and
from 0.5 parts by weight to 6.0 parts by weight of a bromine-based flame retardant based on 100 parts by weight of the polystyrene resin,
wherein the extruded polystyrene foam is obtained by the process comprising extruding a polystyrene resin composition comprising the polystyrene resin, the bromine-based flame retardant, and a foaming agent,
wherein
the extruded polystyrene foam has an apparent density of from 20 kg/m$^3$ to 45 kg/m$^3$ and a closed cell ratio of 90% or more,
the foaming agent comprises hydrofluoroolefin and a second organic foaming agent,
the hydrofluoroolefin is tetrafluoropropene,
an amount of tetrafluoropropene is from 0.030 mol to 0.125 mol based on 100 g of the polystyrene resin,
the second organic foaming agent is at least one organic foaming agent selected from the group consisting of dimethylether, methyl chloride, and ethyl chloride,
an amount of the second organic foaming agent is from 0.059 mol to 0.109 mol based on 100 g of the polystyrene resin,
the second organic foaming agent comprises an organic foaming agent having a polystyrene permeability of 0.5×10$^{-10}$ cc·cm/cm$^2$·s·cmHg or more and does not comprise an organic foaming agent having a polystyrene permeability of less than 0.5×10$^{-10}$ cc·cm/cm$^2$·s·cmHg, and
a total amount of tetrafluoropropene and the second organic foaming agent is from 0.105 mol to 0.200 mol based on 100 g of the polystyrene resin.

2. The extruded polystyrene foam according to claim 1, wherein the amount of tetrafluoropropene is from 0.040 mol to 0.105 mol based on 100 g of the polystyrene resin.

3. The extruded polystyrene foam according to claim 1, wherein the second organic foaming agent is dimethylether.

4. The extruded polystyrene foam according to claim 1, wherein the polystyrene resin comprises a homopolymer of a styrene monomer.

5. The extruded polystyrene foam according to claim 2, wherein the second organic foaming agent is dimethylether.

6. The extruded polystyrene foam according to claim 1, wherein the amount of tetrafluoropropene is from 0.045 mol to 0.090 mol based on 100 g of the polystyrene resin.

7. The extruded polystyrene foam according to claim 1, wherein the total amount of tetrafluoropropene and the second organic foaming agent is from 0.115 mol to 0.200 mol based on 100 g of the polystyrene resin.

8. The extruded polystyrene foam according to claim 1, wherein the foaming agent further comprises an inorganic foaming agent.

9. A method for producing an extruded polystyrene foam, method comprising:
heating and melting a polystyrene resin composition comprising a polystyrene resin and from 0.5 parts by weight to 6.0 parts by weight of a bromine-based flame retardant based on 100 parts by weight of the polystyrene resin;
adding a foaming agent to the heated and melted polystyrene resin composition under a high-pressure condition such that a mixture is prepared;
cooling the mixture to a predetermined resin temperature; and then extruding the cooled mixture into a low-pressure area such that an extruded foam is formed,
wherein the extruded foam has an apparent density of from 20 kg/m$^3$ to 45 kg/m$^3$ and a closed cell ratio of 90% or more,
the foaming agent comprises hydrofluoroolefin and a second organic foaming agent,
the hydrofluoroolefin is tetrafluoropropene,
an amount of the tetrafluoropropene is from 0.030 mol to 0.125 mol based on 100 g of the polystyrene resin,
the second organic foaming agent is at least one organic foaming agent selected from the group consisting of dimethylether, methyl chloride, and ethyl chloride,
an amount of the second organic foaming agent is from 0.059 to 0.109 mol based on 100 g of the polystyrene resin,
the second organic foaming agent comprises an organic foaming agent having a polystyrene permeability of $0.5 \times 10^{-10}$ cc·cm/cm$^2$·s·cmHg or more and does not comprise an organic foaming agent having a polystyrene permeability of less than $0.5 \times 10^{-10}$ cc·cm/cm$^2$·s·cmHg, and
a total amount of the hydrofluoroolefin tetrafluoropropene and the second organic foaming agent is from 0.105 mol to 0.200 mol based on 100 g of the polystyrene resin.

* * * * *